(12) United States Patent
Björk et al.

(10) Patent No.: US 10,259,629 B2
(45) Date of Patent: Apr. 16, 2019

(54) PACKAGE MATERIAL AND PACKAGE CONTAINER FORMED WITH SAID MATERIAL

(71) Applicant: Tetra Laval Holdings & Finance S.A., Pully (CH)

(72) Inventors: Jonas Björk, Lund (SE); Bengt Håkansson, Sjobo (SE); Pär Andersson, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/998,843

(22) Filed: Aug. 17, 2018

(65) Prior Publication Data

US 2019/0047761 A1 Feb. 14, 2019

Related U.S. Application Data

(63) Continuation of application No. 15/538,242, filed as application No. PCT/EP2015/078103 on Nov. 30, 2015, now Pat. No. 10,081,469.

(30) Foreign Application Priority Data

Dec. 22, 2014 (SE) .................................. 1451627-2

(51) Int. Cl.
  *B65D 75/00* (2006.01)
  *B65D 65/40* (2006.01)
  (Continued)

(52) U.S. Cl.
  CPC ................ *B65D 65/40* (2013.01); *B32B 3/08* (2013.01); *B32B 3/266* (2013.01); *B32B 7/06* (2013.01);
  (Continued)

(58) Field of Classification Search
  USPC .... 206/484, 484.1, 484.2; 229/160.2, 87.05; 383/200, 205, 209
  See application file for complete search history.

(56) References Cited

U.S. PATENT DOCUMENTS 4,408,697 A 10/1983 Yoshikawa et al.
4,576,305 A 3/1986 Saunders
(Continued)

FOREIGN PATENT DOCUMENTS

DE 10 2008 00285 12/2009
EP 0279486 8/1988
(Continued)

OTHER PUBLICATIONS

International Search Report and Written Opinion in corresponding PCT Application PCT/EP2015/078103 dated Mar. 9, 2016 (4 pages).
(Continued)

*Primary Examiner* — Jacob K Ackun
(74) *Attorney, Agent, or Firm* — Finnegan, Henderson, Farabow, Garrett & Dunner LLP (57) ABSTRACT

A package material may include one or more layers of plastic laminate, a first side, a second side and a penetration area. A weakening line may extend from the penetration area and may provide an opening area in the package material. The package material may include a plastic opening device, with a first and second portion attached to the first and second side, respectively, and a material bridge penetrating through the penetration area. The second portion may cover at least partly the penetration area and may include a guiding portion extending from the penetration area adjacent to the at least one weakening line as to facilitate rupturing substantially along the at least one weakening line.

15 Claims, 4 Drawing Sheets

(51) Int. Cl.
| | | |
|---|---|---|
| *B32B 7/06* | (2019.01) | |
| *B32B 3/26* | (2006.01) | |
| *B32B 3/08* | (2006.01) | |
| *B32B 29/00* | (2006.01) | |
| *B32B 27/00* | (2006.01) | |
| *B32B 15/20* | (2006.01) | |
| *B65D 75/70* | (2006.01) | |

(52) U.S. Cl.
    CPC .............. *B32B 15/20* (2013.01); *B32B 27/00*
        (2013.01); *B32B 29/00* (2013.01); *B65D 75/70*
        (2013.01); *B32B 2307/7244* (2013.01); *B32B*
        *2439/62* (2013.01); *B32B 2439/70* (2013.01)

(56) References Cited

U.S. PATENT DOCUMENTS

| | | | |
|---|---|---|---|
| 4,773,541 A * | 9/1988 | Riddell | ................. B65D 3/263 |
| | | | 206/391 |
| 4,828,138 A | 5/1989 | Andersson | |
| 4,855,168 A | 8/1989 | Imaizumi | |
| 5,029,752 A | 7/1991 | Andersson | |
| 5,035,328 A | 7/1991 | Kim | |
| 5,203,634 A | 4/1993 | Kim | |
| 5,836,697 A | 11/1998 | Chiesa | |
| 5,921,464 A | 7/1999 | Seki | |
| 8,365,978 B2 | 2/2013 | Yoshimura et al. | |
| 9,708,104 B2 * | 7/2017 | Lyzenga | ................. B65B 9/067 |
| 9,969,529 B2 * | 5/2018 | Bazbaz | ................. B32B 5/024 |
| 2003/0118255 A1 | 6/2003 | Miller | |

FOREIGN PATENT DOCUMENTS

| | | |
|---|---|---|
| EP | 1145975 | 10/2001 |
| EP | 2889231 | 7/2015 |
| GB | 2003446 | 3/1979 |
| GB | 2 232 397 | 12/1990 |
| WO | WO 03-095199 | 11/2003 |
| WO | WO 2009-000927 | 12/2008 |
| WO | WO 2015-101427 | 7/2015 |
| WO | WO 2015-101481 | 7/2015 |
| WO | WO 2015-169656 | 11/2015 |

OTHER PUBLICATIONS

International-type Search Report in corresponding Swedish Application SE 1451627.2 dated Dec. 22, 2014 (7 pages).

* cited by examiner

PACKAGE MATERIAL AND PACKAGE CONTAINER FORMED WITH SAID MATERIAL

This application is a continuation of U.S. application Ser. No. 15/538,242, filed Jun. 21, 2017, which is a U.S. national stage entry under 35 U.S.C. § 371 of International Application No. PCT/EP2015/078103, filed Nov. 30, 2015, which claims the benefit of Swedish Application No. 1451627-2, filed Dec. 22, 2014, all of which are incorporated herein by reference.

The present invention relates to a package material and to a package container comprising such material.

BACKGROUND OF THE INVENTION

Package containers of the single use disposable type for food products are often produced from a packaging material. Such packaging material may include paperboard or carton, but may also just contain different plastic layer or metalized film layers. Consequently different kind of food products, like liquid, semi-liquid or solid food products can be stored in such containers.

One example is related to a simple bag, which can contain several plastic layer sealed together to form a bag like shape in order to store for example potato chips, candy's or other solid food products. Some other containers are suitable for aseptic packaging of liquid foods such as milk, fruit juices, etc are marketed and sold for long term ambient storage. The packaging material in such package container is typically a laminate comprising a bulk layer of paper or paperboard, outer, liquid-tight layers of thermoplastics, a gas barrier layer, most commonly an aluminum foil and finally one or more inside layers composed of one or several part layers, comprising heat-sealable adhesive polymers and/or heat-sealable polyolefins.

Package containers are normally produced and filled on fully automatic packaging machines. In one example, a continuous tube is formed from the web-fed packaging material (said material can include carton based material, but pure plastic laminate may also be suitable); the web of packaging material is sterilized in the packaging machine, and the sterilized web of packaging material is maintained in a closed, sterile environment in the subsequent step. The web is folded and sealed longitudinally to form a vertical tube. The tube is filled with the sterilized or sterile-processed food product, and is sealed and subsequently cut along equally spaced cross sections to form pillow packs, which are then folded mechanically to form respective finished, e.g. substantially parallelepiped-shaped, package containers.

Commonly, the package container have an opening device in order to facilitate consumer opening, many different types of opening devices including pull-tabs or molded opening devices, as for example discussed in WO03/095199 25 and WO/2009/000927.

However, the latter type of package is a high-volume (in terms of packages per time unit) and low-cost package (due to the properties of the packaging material), and complex openings might hamper the production speed and be detrimental for the cost of the package. On the other hand, the consumer requests an easy and appealing opening with good pourability.

For this reason there is a need for an opening device having a high efficiency in regard of the amount of material used and meeting the consumers' requests.

SUMMARY OF THE INVENTION

For the purpose of the invention, the term "package material blank" or "blank" shall include an individual sheet or a blank in a package material web. Such package material web may comprise one or more "package material blanks" arranged after each other in a continuous web, some of those blanks in different processing stages, i.e. on one blank in such web may comprise an opening device, while other blanks on the web might still be unprocessed.

For the purpose of the invention, the terms "container, package" and "package" or "packaging container" refer to the same structure. In addition, the terms material, material laminate structure or packaging material refers to the package material blank. The term "cellulosic material" may comprise one or more layers of paper, cardboard or any other cellulosic fiber based material.

In an embodiment, a package material comprises a multilayer material structure with one or more layers of plastic laminate. The multilayer material has a dedicated penetration area. On said area plastic material penetrates through the multilayer structure to be attached to one of the surfaces of the multilayer structure as to form an opening on the package material. The package also comprises one or more weakening lines, for example (but not limited to perforation or compression lines)

In an embodiment said one or more weakening lines extend from the penetration area to provide an opening in the multilayer material structure when being ruptured. In another embodiment, a weakening line circumferences the penetration area.

In accordance with the present invention, a plastic opening device is provided on the multilayer structure, comprising a first and second portion, at least the second portion being attached to the multilayer structure. A material bridge penetrates through the structure and connects the first and second portion of the opening device. The second portion now at least partly covers the penetration area and comprises a guiding portion. Said guiding portion extends from the penetration area adjacent to the at least one weakening line as to facilitate rupturing substantially along the at least one weakening line.

In accordance with the present invention, a more precise opening is achieved by guiding the rupture of the multilayer structure along said one or more weakening lines. The guiding portion supports the rupturing along those lines. As the applicant found out, the weakening line alone does not guarantee under all circumstances a rupture along the weakening line. In fact, the material structure is often ripped apart differently, resulting not only in reduced visual appearance, but also in pouring problems. The guiding portion facilitates the rupture process and may compensate different opening techniques used by the consumer when opening a package made from said material.

In an embodiment, the guiding portion comprises at least one leg section having an edge following the curve of the one or more weakening line. It may be useful, if the leg section or parts of the guiding portion in general is arranged on the area of the multilayer structure, which forms the opening space. In an embodiment, the guiding portion comprises two leg sections on both sides of the weakening line(s). Such embodiment improves the guiding characteristics during opening. The two legs on each side of the weakening line can be closed at their respective end, thus enclosing the end of the weakening lines. Such embodiment may support the opening process by the consumer, such that the rupture of the multilayer structure is prevented from continuing beyond the weakening lines.

To further improve guidance and easy opening, the second portion may comprise a recessed material line extending adjacent to the one or more weakening lines towards the penetration area. It may encircle the penetration area, but actually not cross or touch it. The recessed material line will be an advantage, if the second portion extends over the portions of the weakening line(s). In such embodiment the recessed material line may follow the curve of the underlying weakening line. Particularly it may be continuous and follow the shape. In some area the recessed material line may avoid the penetration area by moving around said penetration area. The recessed line can be rather deep, for example up to 30% to 90% of the second's portion thickness, or between 50% to 80% of the thickness.

To reduce bouncing of the rupture line during the opening, the distance between the guiding portion and the weakening line is rather small and in the range of a few 100 µm to about 1.5 mm.

In an embodiment, the material of the second portion crosses the weakening line and particularly the perforation at a spot, at which the multilayer structure is not weakened or perforated. Otherwise some leakage problems may occur as the plastic material of the second portion may rupture the perforation at that spot during molding of the opening.

Another aspect is related to the multilayer structure. In an embodiment, the multilayer structure in the opening area provided by weakening line(s) comprises a cellulosic layer, said layer being absent in the penetration area. Thus the material forming the opening device can be injected through the penetration area more easily and defect issues caused by ripping through cellulosic material are prevented. Alternatively, the penetration area may comprise a reduced thickness compared to the surrounding areas and particular the multilayer structure in the opening area.

The penetration area may comprise different characteristics. For example, it can be larger than an area covered by the material bridge. It may have different shapes, i.e. circular, elliptic and rectangular or any other shape that fits the material bridge and the purpose of penetrating through the area.

DESCRIPTION OF THE DRAWINGS

In the following, the invention is explained in greater detail supported by several embodiments and the accompanying drawings, in which.

DETAILED DESCRIPTION OF THE EMBODIMENTS

Figure 1:
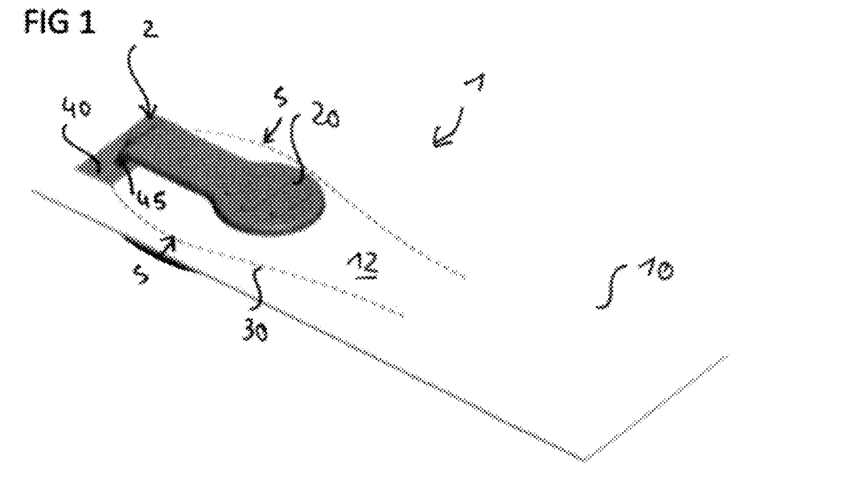
FIG. 1 illustrates a perspective view of a first embodiment of the present invention.

FIG. 1 illustrates a perspective view of a packaging material 1 in accordance with the present invention. An opening device 2 is attached to a multilayer material structure 10 in a certain area to facilitate an opening as it will be explained later.

The multilayer structure 10 comprises one or more layer of plastic material. The plastic material layers can be of different material and may have different thickness, opaque or transparent to achieve certain effects, i.e. acting as an oxygen barrier, a light barrier and the like. Multilayer structure 10 in this embodiment also comprises a carton layer between the plastic material layers. Such carton layer acts as a light barrier and also provides certain stiffness for the package material and a package made from such material. Multilayer structures of this type can be found for example in European patent application EP13199808 or publication EP592920, the content of which related to the package material composition is herewith incorporated by reference.

The opening device 2 comprises a first or grip portion 20 for rupturing multilayer structure 10 to create an opening. The grip portion 20 is connected to a bridge material portion 45, which penetrates the multilayer structure in a penetration area 40. Said penetration area 40 is different from the surrounding area of the multilayer structure 10. For example penetration area 40 comprises a lower thickness than the surrounding areas due to the lack of one or more layers of the multilayer structure. In other words, the thickness of penetration area 40 is reduced by removing one or more layer of the multilayer structure in said area. Alternatively, the thickness in penetration area 40 can be reduced by compression or other techniques. The penetration area 40 is of rectangular shape and slightly larger than the bridge's cross-section. This allows compensating for small positioning errors during the injection molding process forming the opening device 20.

The opening device 2 also comprises a second portion attached to the lower surface of the multilayer structure, which will be explained with reference to FIGS. 2 and 3. To facilitate the creation or forming of the opening, the multilayer structure comprises a weakening line 30, implemented in this embodiment as a perforation. Alternatively the weakening line can be formed as a compression line or by other means. It acts as a guidance at which—ideally—the material of the multilayer structure is ruptured, when the grip portion 20 is pulled to create the opening. The perforation 30 extends directly adjacent from the penetration area 40 in two s-curved shaped manners. The distance between the two s-curved perforation lines 30 is first increasing to a maximum distance at area S and then slowly decreasing towards their respective ends. The area 12 of the multilayer structure enclosed or partly enclosed by the two weakening lines 30 forms the opening part of the device. In other words, when the opening device is pulled, the area 12 is ruptured apart from the remaining multilayer structure creating the opening.

Figure 2:
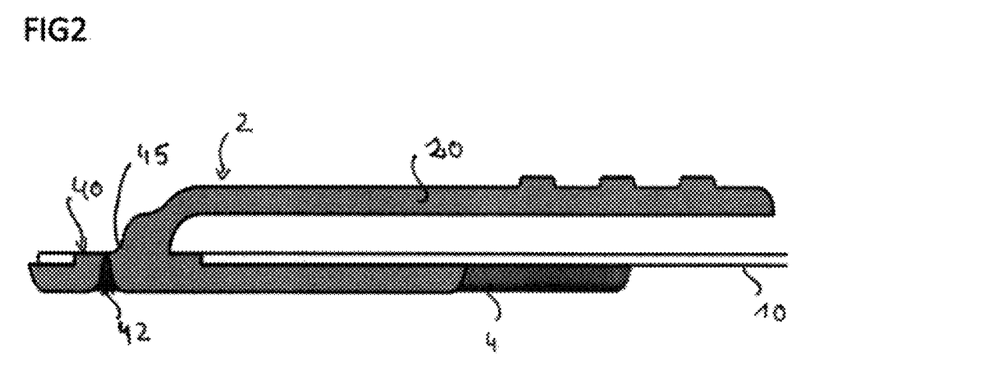
FIG. 2 shows the side view of the first embodiment according to FIG. 1.
Figure 3:
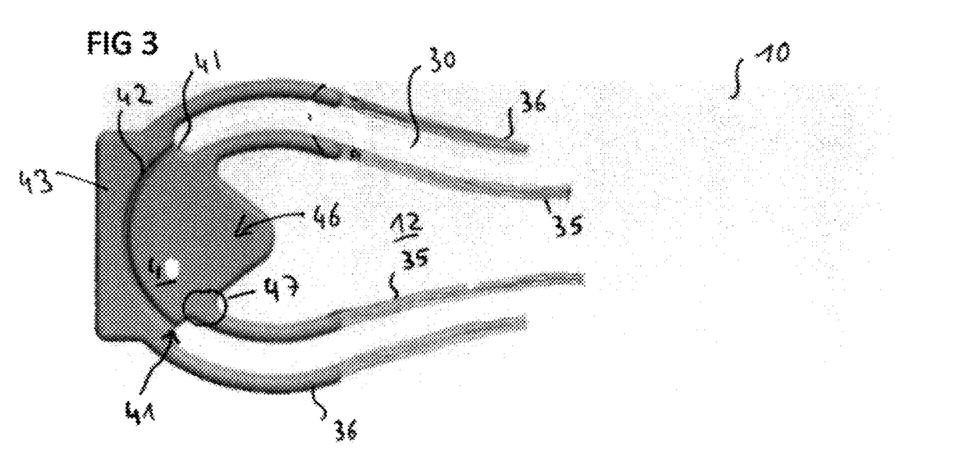
FIG. 3 shows a bottom view of the embodiment according to FIG. 1.

FIG. 2 and FIG. 3 show the cross-view and bottom view of the opening device 2 and its attachment on the surface of the multilayer material structure. The opening device is made by injection molding, wherein two mold halves are placed over each other enclosing the penetration area 40. In the illustrated embodiment, plastic material is injected to penetrate though the whole penetration area and filling the area completely as seen in the cross-section. Said material forms bridge 45 connecting the first or grip portion 20 of the opening device to the second portion 4. Second portion 4 comprises an extension 43 and an opening support 46. Opening support 46 extends from the material bridge portion 45 onto the surface of the multilayer layer structure being part of the opening area 12. It comprises a centrally arranged pointed and rounded end portion.

Extension 43 is arranged opposite the opening support 46 and covers a portion of the multilayer structure outside area 12. In this regard area 12 is defined by the perforation line and its virtual extension connecting ends of the perforation together. Extension 43 and opening support 46 are separated by a material recess 42. Said recess comprises a depth, which is about 70% to 90% of the second portion's thickness. The remaining material thickness in recess 42 may be in the range of a few 10 µm. Recess 42 extends from one edge of second portion 4 in a circular manner to the other edge of second portion. One can say that recess 42 is an extension of the weakening line 30 and "connects" both perforation lines. Recess line 30 facilitates the opening and reduces the opening force which at the same time acts as an initial rupturing point, when the grip portion is pulled. When recess line 42 is being ruptured in the initial step of the opening procedure, the rupture continues along the recess first and then extends to the perforation lines 30.

As can be seen from FIG. 2, the bridge portion 45 and particular the connection to the first or grip portion 20 is arranged next to the recess 42 closer to area 12 and over opening support 46.

Second portion 4 also comprises two leg sections 36 and 35, respectively. Leg section 36 extends from the extension portion 46 and follows the weakening lines 30 substantially parallel approximately shortly before the s-curved shaped perforation line switches its direction in the shape. Accordingly, a second leg section 35 (more precisely a second pair of leg section) extends from support section 46 substantially parallel to the perforation line 30 to about the same end point. The leg section 35 is therefore arranged on area 12. The distance between the perforation line 30 and the respective leg sections 35 and 36 is a few 100 µm. In this example, it is about the thickness of the respective legs. To improve the guiding of the leg sections it is often smaller than the thickness of the leg sections, and in the range of 100 µm to 400 µm.

Figure 4:
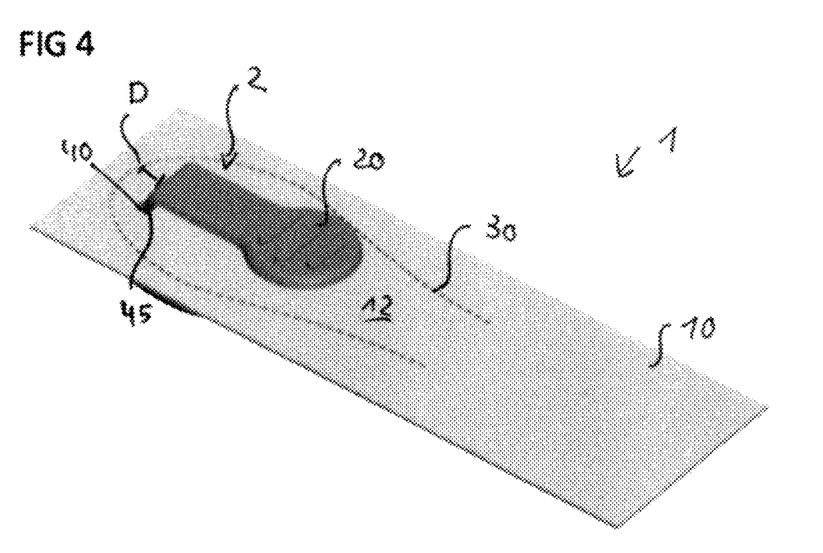
FIG. 4 illustrates a perspective view of a second embodiment according to the present invention.

FIG. 4 illustrates a second embodiment of the present invention. In this embodiment, the penetration area 40 is rather small and approximately in the size of the material bridge 45 penetrating the multilayer material structure in penetration area 40. The grip portion 20 comprises the same shape as in the first embodiment. As illustrated the weakening or perforation line 30 extends from one end on the multilayer structure around the bridge 45 and the penetration area 40 to the other end. Perforation line 30 is spaced apart from penetration area 40 by distance D. As a result, area 12 is encircling the penetration area 40. This is different from the first embodiment according to FIG. 1, wherein area 12 abuts only a part of penetration area 40. Due to the shape of perforation line 30, said distance is smallest at the edges of penetration area 40.

Figure 5:
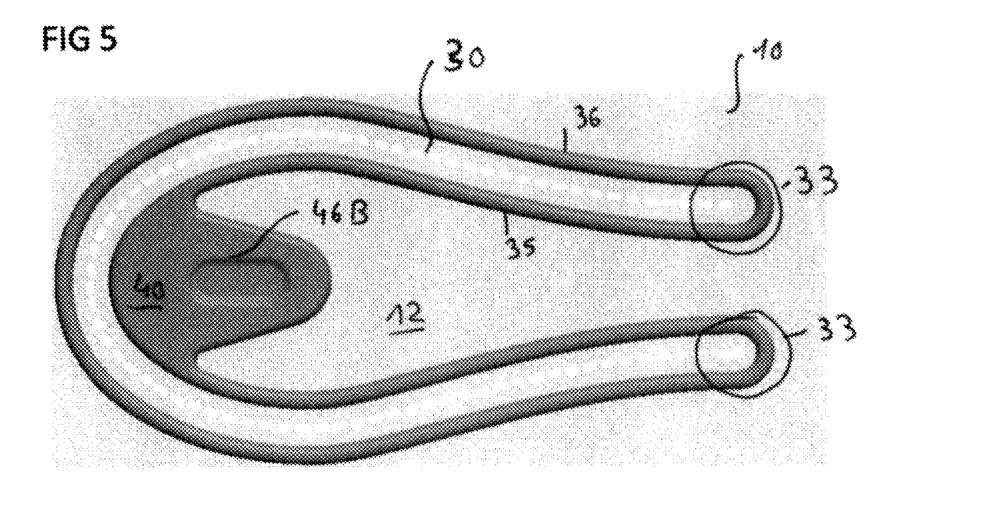
FIG. 5 shows the bottom view of the second embodiment.

A bottom view of the second embodiment is illustrated in FIG. 5. Opening section 46 of the second portion comprises a curved shape divided into a circular and a subsequently attached linear shape. A small recess in the middle reduces material consumption of the support section. The leg section 35 extends from the second portion substantially parallel to the perforation line 30 all the way to its end 33, at which it encircles the perforation line to turn into the outer leg section 36. In other words, the leg sections 35 and 36 encircle the perforation line 30 on both sides completely. Their distance to perforation line 30 is similar to the one described in the first embodiment.

Figure 6A:
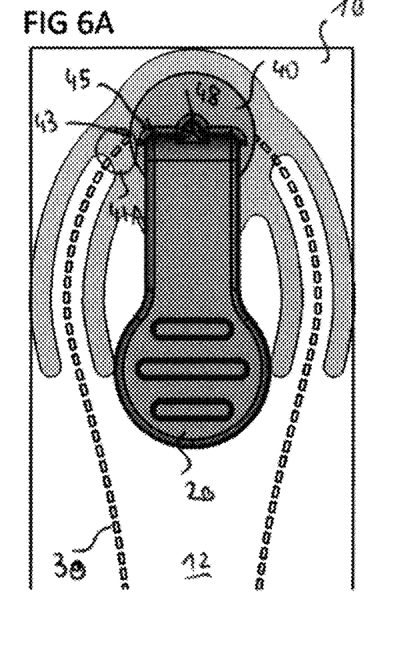
FIG. 6A illustrates a top view of a third embodiment according to the present invention.
Figure 6B:
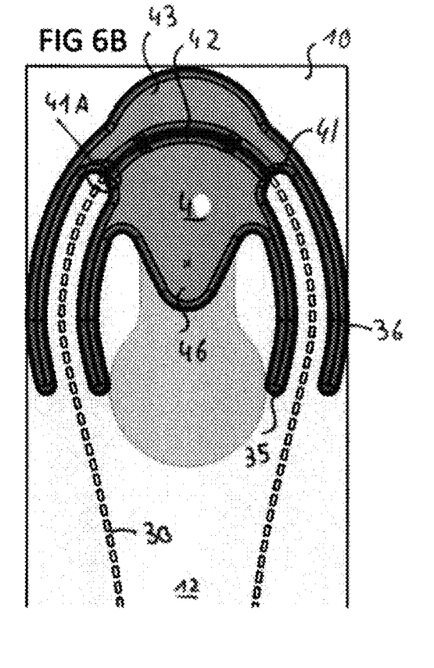
FIG. 6B shows the bottom view of the embodiment according to FIG. 6A.

FIGS. 6A and 6B now illustrate the top and bottom view of a similar embodiment to the one in FIG. 1. The grip portion 20 turns into the bridge portion 45 at its upper end, wherein bridge portion 45 comprises a reinforcement bar 48. The reinforcement bar 48 enhances the stability when the grip portion is pulled, because bridge portion 45 is arranged over the recess line 42 in the second portion 4 as seen on FIG. 6B. Recess line 42, as illustrated in FIG. 3B is adjacent to the perforation line 30 and extends in a curved shaped manner across the second portion 4, thereby separating said portion into section 43 and opening support 46. Extension 43 is shaped with a smaller radius than recess lines 42 providing stability to facilitate the initiation of the rupture on recess line 42.

As one can see, the perforation line 30 is covered in area 41A with material of second portion 4 at a perforated part of the multilayer structure. In addition, second portion 4 extends over circular shaped penetration area 40. Consequently, a part of second portion 4 including the recess line 42 extends over and covers the perforation line 30 in area 41A of FIGS. 6A and 6B. The perforation line itself extends below the plastic material of second portion 4 till the penetration area and particularly to a spot in the middle of the penetration area, i.e. where the diameter of the penetration area is largest.

As recess line 42 and perforation line 30 partly overlap as shown in FIGS. 6A and 6B, the perforation line will easily be ruptured after the initial rupture of recess line 42. The required force for the initial rupture is generally higher than the force needed to extend the rupture, however it is already reduced due to the recess line. The leg sections 35 and 36 on both sides of the perforation ensure a rupture along the perforation, because the required force to rupture the multilayer structure across the leg sections 35, 36 is higher than along the perforation line 30. Leg sections 36 end at a portion, where the directions of both perforation lines are facing each other.

In the embodiment according to FIGS. 6A and 4B the outer edges of second portion 4 including the leg sections comprise a higher thickness than the area within the border strip. This will further strengthen the material to guide the rupture and reduce disfigured rupture line into the plastic material of second portion 2.

Figure 7A:
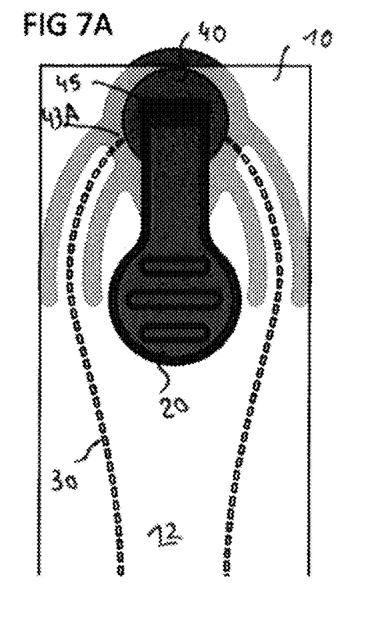
FIG. 7A shows a fourth embodiment.
Figure 7B:
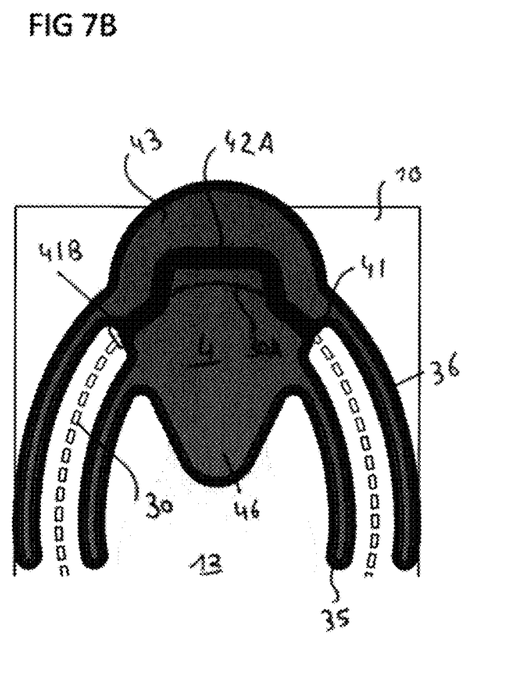
FIG. 7B illustrates the bottom view of the fourth embodiment.

FIGS. 7A and 7B illustrate an alternative opening device attached on a multilayer structure in accordance with the present invention. In the embodiment, penetration area 40 is displaced with respect to a virtual extension 30A of perforation line 30. While in the previous embodiment, the perforation line extend from a spot on the penetration area close to a central horizontal virtual line though the centre of area 40, the perforation line 30 in FIGS. 7A and 7B "hit" the penetration area at a spot beneath the central horizontal virtual line. In other words the distance between the two end points of the perforation line 30 adjacent to the penetration area is less than the diameter of said area (in contrast to the previous embodiment, where it is about the same).

The material bridge 45 through penetration area 40 is displaced and now located outside area 12, given that area 12 is defined by perforation line 30 and any virtual extension 30A connecting end of perforation line 30 together. To facilitate an easy opening, preferably on a recess, recess 42*a* in the second portion 4 is shaped in such way to follow the material bridge. Recess 42A comprises two small sections extending from the respective edge areas 41B until they overlap the penetration area 40, at which they bend upwards. Recess line 42A then encircles bridge portion 45. A middle portion of recess line 42A is substantially straight and parallel to the material bridge width. The structure according to this embodiment reduces the initial opening force and results in a more evenly distributed force during the opening process.

Figure 8:
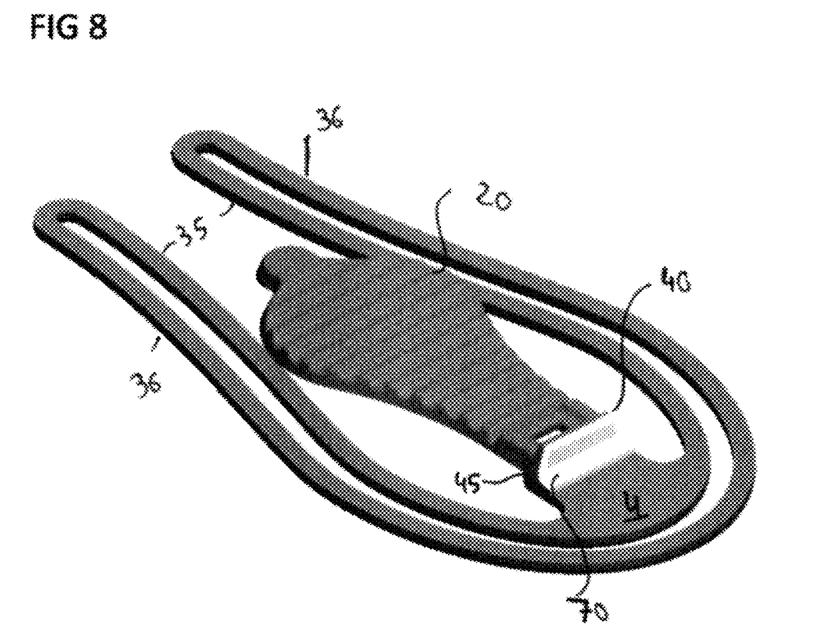
FIG. 8 illustrates a perspective view of a fifth embodiment, without the package material, similar to the second embodiment of the present invention.

FIG. 8 illustrates another embodiment as seen from a perspective view, but without the multilayer material structure. Consequently, one can see the first or grip portion 20 and the second portion 4. Grip portion 20 comprises on its upper surface a periodic ripple structure to enhance the gripping. It ends into the bridge material portion 45 penetrating though the multilayer structure, of which only a small portion 70 of the penetration area is illustrated. Said portion is the results of the injection molding process, in which material is injected from the lower side (bottom side of multilayer structure). The pressure of the injected material is high enough to penetrate the reduced multilayer structure in the penetration area forming grip portion 20 and causing some material 70 of multilayer structure to bend upwards. The material also flows into leg portions 35 and 36.

Figure 9:
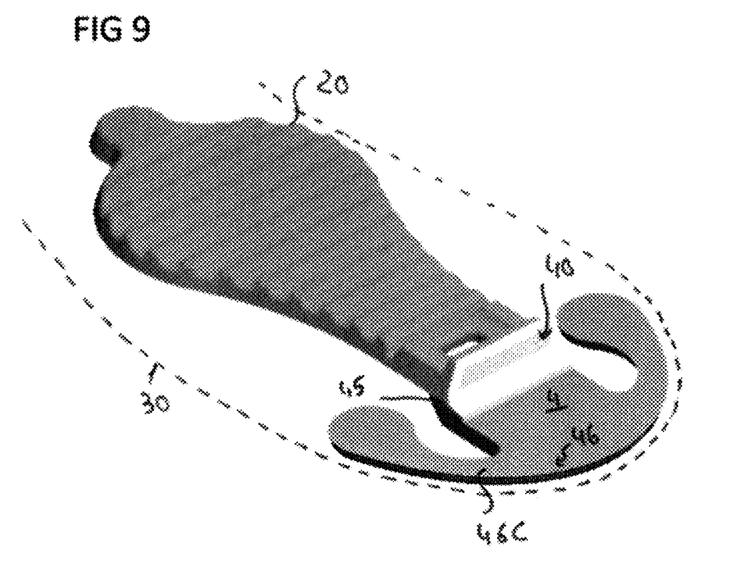
FIG. 9 shows a perspective view of a sixth embodiment in accordance with the present invention.

FIG. 9 illustrates another embodiment, with shortened single leg portion. The dotted line in FIG. 9 represents the perforation or weakening line 30 in the multilayer material structure (not shown in the embodiment. Leg portion 36C is extends from opening support 36 in a rounded drop shaped manner. The end attached to the opening support first decreases in width and follows substantially parallel the perforation line 30. Then it increases to an asymmetric droplet shape with a lower curvature on side adjacent to the perforation line 30. Consequently, opening portion 46 and leg portion 46C follow the perforation line in a mushroom like shape.

Features of the different embodiment illustrates herein can be combined in every way without deviating from the principle of guiding the rupturing during the opening process with the help of a leg portion attached on one side of the package. In the embodiments shown, the leg portion is attached to the lower side of the multilayer structure, opposite the grip portion. However, the leg portion can also be implemented on the same side as the grip portion without deviating from the disclosed principle and within the scope of the claimed subject matter. In other words, the second portion can comprise the grip portion and the leg portions, while it is connected via the material bridge to the first portion, said first portion formed on the "inside" of the package.

The invention claimed is:

1. A package material for a packaging container, the package material comprising:
  a material structure formed of one or more layers of plastic laminate, the material structure having:
    a first side,
    a second side opposite the first side,
    a penetration area configured to provide an opening in the packaging container when the material structure is ruptured, and
    at least two weakening lines extending from the penetration area and configured to create the opening in the packaging container when the material structure is ruptured; and
  an opening device for opening the packaging container and including:
    a first portion attached to the first side and configured to rupture the material structure to create the opening in the packaging container,
    a second portion attached to the second side and configured to facilitate rupturing the material structure to create the opening in the packaging container, and
    a bridge penetrating through the penetration area and connecting the first portion to the second portion,
    wherein the second portion further comprises a recess that is configured to connect the weakening lines within the rupture area to facilitate rupturing substantially along the weakening lines.

2. The package material according to claim 1, wherein the recess connects the weakening lines at least partly along a virtual extension between the weakening lines.

3. The package material according to claim 2, wherein the recess connects the weakening lines along a virtual extension between the weakening lines.

4. The package material according to claim 1, wherein the second portion at least partially covers the penetration area and includes a guiding portion extending from the penetration area adjacent to the weakening lines and configured to facilitate rupturing substantially along the weakening lines.

5. The package material according to claim 4, wherein at least one weakening line extends beyond the guiding portion.

6. The package material according to claim 4, wherein the guiding portion includes at least one leg section having an edge arranged at least partially substantially parallel to at least one of the weakening lines.

7. The package material according to claim 6,
  wherein the at least one leg section is arranged at a side of the at least one weakening line on the material structure, and
  wherein the side of the at least one weakening line forms the opening when ruptured.

8. The package material according to claim 6, wherein a distance from the at least one leg section to the at least one weakening line is in a range of 50 to 1500 µm.

9. The package material according to claim 6, wherein a distance from the at least one leg section to the at least one weakening line is in a range of 500 to 1500 µm.

10. The package material according to claim 6, wherein a length of the at least one leg section is smaller than a length of the at least one weakening line.

11. The package material according to claim 1,
  wherein the first and second weakening lines have an s-curved shape, and
  wherein a distance between the first and second weakening lines increases in a first section and decreases in a second section along the s-curve shape.

12. The package material according to claim 1,
  wherein the material structure in the area provided by the at least one weakening line comprises a cellulosic layer, and
  wherein cellulosic layer is absent in the penetration area.

13. The package material according to claim 1, wherein the penetration area includes at least one of:
  an area larger than an area covered by the bridge,
  a substantially circular shape,
  a substantially rectangular shape, or
  the material structure in the penetration area having at least one layer less than the material structure of the surrounding area.

14. A package container having the package material according to claim 1, wherein:
  the package material includes side edge portions,
  the package material is shaped to form the package container and sealed along the side edge portions, and a first seal is arranged substantially opposite the opening device and at least a second seal is arranged substantially perpendicular to the opening device.

15. A package material for a packaging container, the packaging material comprising:
- a multilayer material structure having:
    - a penetration area configured to provide an opening in the packaging container when the material structure is ruptured, and
    - at least two weakening lines extending from the penetration area and configured to create the opening in the packaging container when the material structure is ruptured; and
- an opening device for opening the packaging material and having:
    - a first portion attached to a first side of the material structure and configured to rupture the material structure to create the opening in the packaging container,
    - a second portion attached to a second side of the material structure and configured to facilitate rupturing the material structure to create the opening in the packaging container, and
    - a bridge connecting the first portion to the second portion,
- wherein the second portion further comprises a recess that is configured to connect the weakening lines within the rupture area to facilitate rupturing substantially along the weakening lines.

* * * * *